(12) United States Patent (10) Patent No.: US 9,261,224 B2
Harris (45) Date of Patent: Feb. 16, 2016

(54) GARMENT HANGER COLLECTION APPARATUS

(71) Applicant: David William Harris, Aurora, OR (US)

(72) Inventor: David William Harris, Aurora, OR (US)

( * ) Notice: Subject to any disclaimer, the term of this patent is extended or adjusted under 35 U.S.C. 154(b) by 266 days.

(21) Appl. No.: 13/967,246

(22) Filed: Aug. 14, 2013

(65) Prior Publication Data

US 2014/0048670 A1 Feb. 20, 2014

Related U.S. Application Data

(60) Provisional application No. 61/684,678, filed on Aug. 17, 2012.

(51) Int. Cl.
*A47G 25/14* (2006.01)
*F16M 11/00* (2006.01)

(52) U.S. Cl.
CPC ........... *F16M 11/00* (2013.01); *A47G 25/1442* (2013.01)

(58) Field of Classification Search
CPC ...................... A47G 25/1442; Y10T 24/1498
USPC .............. 211/85.3, 49.1, 60.1, 189, 194, 195, 211/204, 206, 181.1, 182; 223/85; 248/68.1, 69, 70, 74.1, 74.3, 74.4, 499; 248/500, 505, 506; 224/927, 925, 455, 460, 224/534, 568; 206/177; 24/71 CT, 583.1, 24/16 PB
See application file for complete search history.

(56) References Cited

U.S. PATENT DOCUMENTS

| 313,410 | A | * | 3/1885 | Eckert et al. | ............. | H02G 7/10 |
| | | | | | | 24/16 PB |
| 2,122,324 | A | | 6/1938 | McDermott | | |
| 2,530,609 | A | | 11/1950 | Friedman | | |
| 2,546,600 | A | * | 3/1951 | Holden | ................ | A47G 25/743 |
| | | | | | | 211/45 |
| 2,609,919 | A | | 9/1952 | Lee | | |
| 2,918,174 | A | | 12/1959 | Tabbi | | |
| 3,115,968 | A | | 12/1963 | Peterson | | |
| 3,302,258 | A | * | 2/1967 | Meyer | ................... | A44C 5/0046 |
| | | | | | | 24/16 PB |
| 3,357,544 | A | | 12/1967 | Gingher | | |
| 3,490,599 | A | | 1/1970 | Von Maur, Jr. | | |
| 3,661,268 | A | | 5/1972 | Boley | | |
| 3,692,188 | A | | 9/1972 | Bayne | | |
| 3,739,429 | A | | 6/1973 | Kohke | | |
| 3,757,936 | A | * | 9/1973 | Lindegren | .............. | B65D 83/08 |
| | | | | | | 206/527 |

(Continued)

FOREIGN PATENT DOCUMENTS

WO 2006102127 9/2006

*Primary Examiner* — Terrell McKinnon
*Assistant Examiner* — Michael McDuffie
(74) *Attorney, Agent, or Firm* — Kolisch Hartwell, P.C.

(57) ABSTRACT

Garment hanger collection apparatus, garment hanger holders, and garment hanger binders are disclosed. The garment hanger holder may include a holder base and a planar holder member fixedly attached to, or formed with, the holder base. The holder member may have an elongate slot sized to receive hooks of one or more garment hangers in a first orientation to hang the one or more garment hangers from the hooks. The garment hanger holder may additionally include a planar orientation member fixedly attached to, or formed with, the holder member and configured to obstruct and prevent the hooks from being inserted in the elongate slot in an orientation different from the first orientation. The garment hanger binder may include a planar binder base having a frame and a plurality of elongated apertures defining a plurality of elongated strips therebetween.

8 Claims, 4 Drawing Sheets

(56) References Cited

U.S. PATENT DOCUMENTS

| | | | |
|---|---|---|---|
| 4,016,981 A | 4/1977 | Hildt | |
| 4,415,093 A * | 11/1983 | Livingston | A47G 25/0692 16/87.2 |
| 4,424,905 A | 1/1984 | Keen | |
| 4,752,054 A * | 6/1988 | Jonsson | F16L 3/01 24/16 PB |
| 4,768,658 A | 9/1988 | Shafto | |
| 4,779,828 A * | 10/1988 | Munch | H02G 3/32 24/16 PB |
| 4,997,157 A * | 3/1991 | Sweeny | A62C 13/78 248/310 |
| 5,188,241 A | 2/1993 | Kobza et al. | |
| D335,402 S | 5/1993 | Eckner | |
| 5,441,515 A * | 8/1995 | Khosravi | A61F 2/93 606/194 |
| 5,572,775 A * | 11/1996 | Mailloux | A47G 25/1407 211/123 |
| 5,752,682 A * | 5/1998 | Anderson | H02G 3/26 248/316.7 |
| 5,833,184 A | 11/1998 | Scola | |
| 5,855,591 A * | 1/1999 | Bierman | A61M 25/02 24/16 PB |
| 5,924,578 A | 7/1999 | McKenzie | |
| 5,967,316 A * | 10/1999 | Abbruzzese | B65B 13/027 140/93 A |
| D417,802 S | 12/1999 | Spurgeon et al. | |
| 6,044,525 A * | 4/2000 | Sastre | B65D 63/1018 24/16 PB |
| 6,109,457 A | 8/2000 | Dahnke | |
| 6,111,194 A * | 8/2000 | Kroulik | F16L 57/06 138/128 |
| 6,230,904 B1 | 5/2001 | Licari | |
| 6,332,248 B1 | 12/2001 | Daniggelis et al. | |
| D465,352 S | 11/2002 | Kim | |
| 6,520,349 B2 | 2/2003 | Keen | |
| 6,588,074 B2 * | 7/2003 | Galkiewicz | A44B 18/0053 24/16 PB |
| 7,028,855 B2 * | 4/2006 | Edwards | A47G 25/1442 211/123 |
| 7,210,576 B2 * | 5/2007 | Lam | A47G 25/1442 206/300 |
| D556,450 S | 12/2007 | Bentley et al. | |
| 7,377,396 B2 | 5/2008 | Keen | |
| 7,828,144 B2 | 11/2010 | Bentley et al. | |
| 8,201,685 B1 * | 6/2012 | Licari | B65D 71/08 206/300 |
| 9,108,779 B1 * | 8/2015 | Pando | B65D 63/1063 |
| 2005/0108858 A1 * | 5/2005 | Daito | H02G 3/32 24/16 PB |
| 2005/0115028 A1 * | 6/2005 | Cheung | B65D 63/1027 24/16 PB |
| 2007/0234524 A1 | 10/2007 | Witt | |
| 2011/0095089 A1 * | 4/2011 | Kolton | G06K 19/041 235/492 |
| 2012/0198680 A1 * | 8/2012 | Durben | A47G 25/08 29/428 |

* cited by examiner

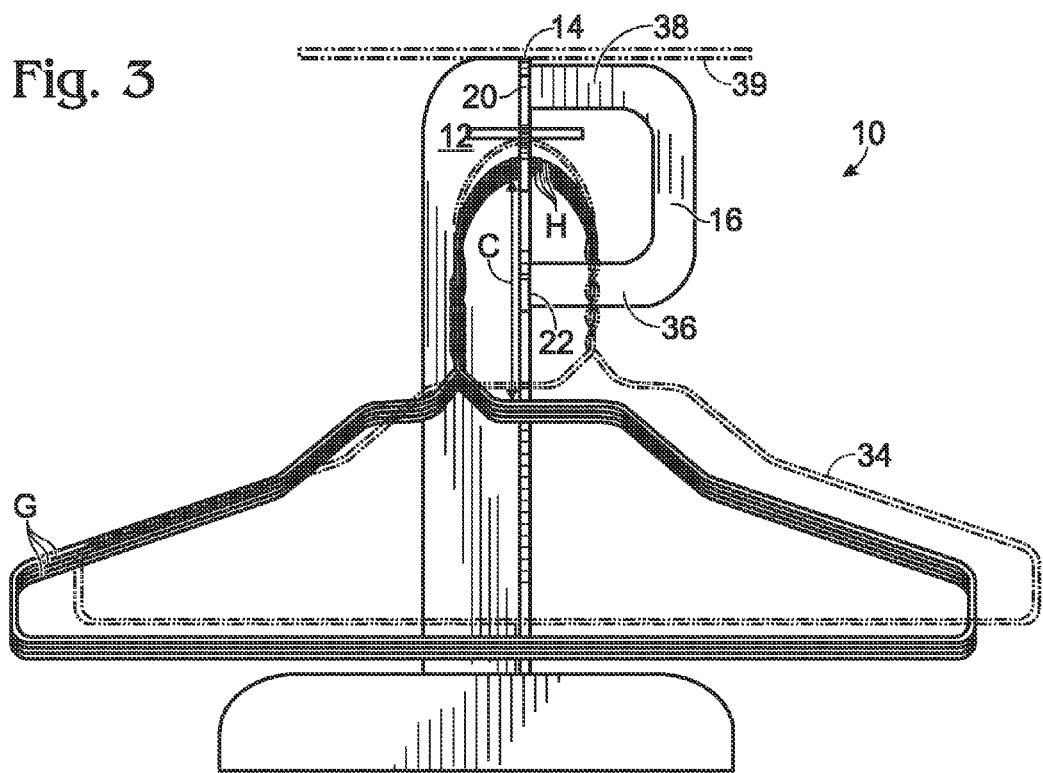
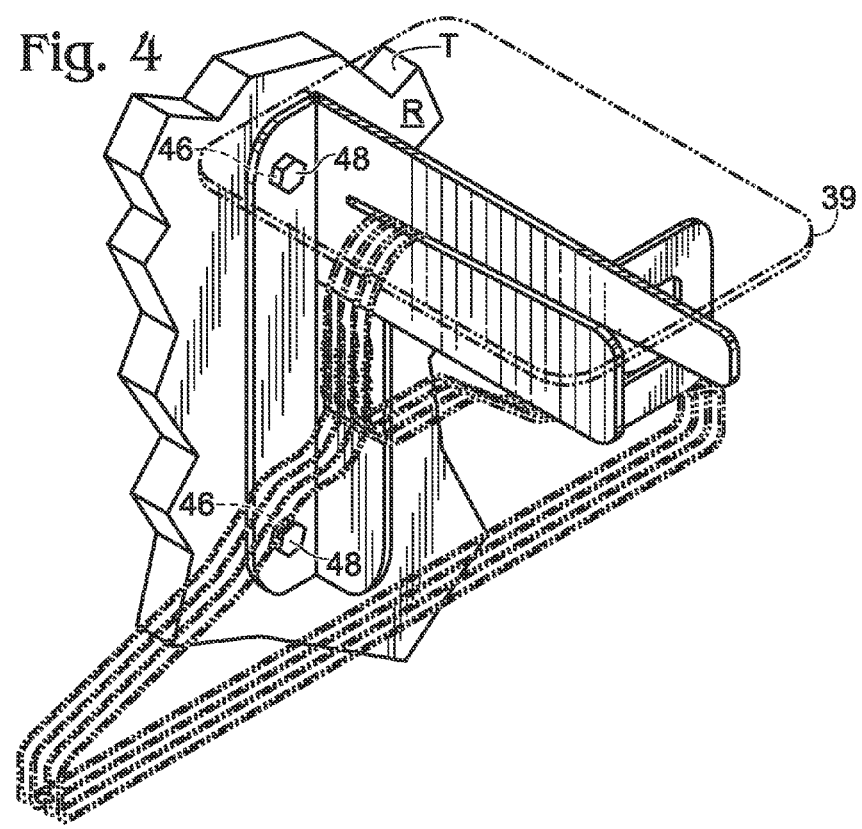

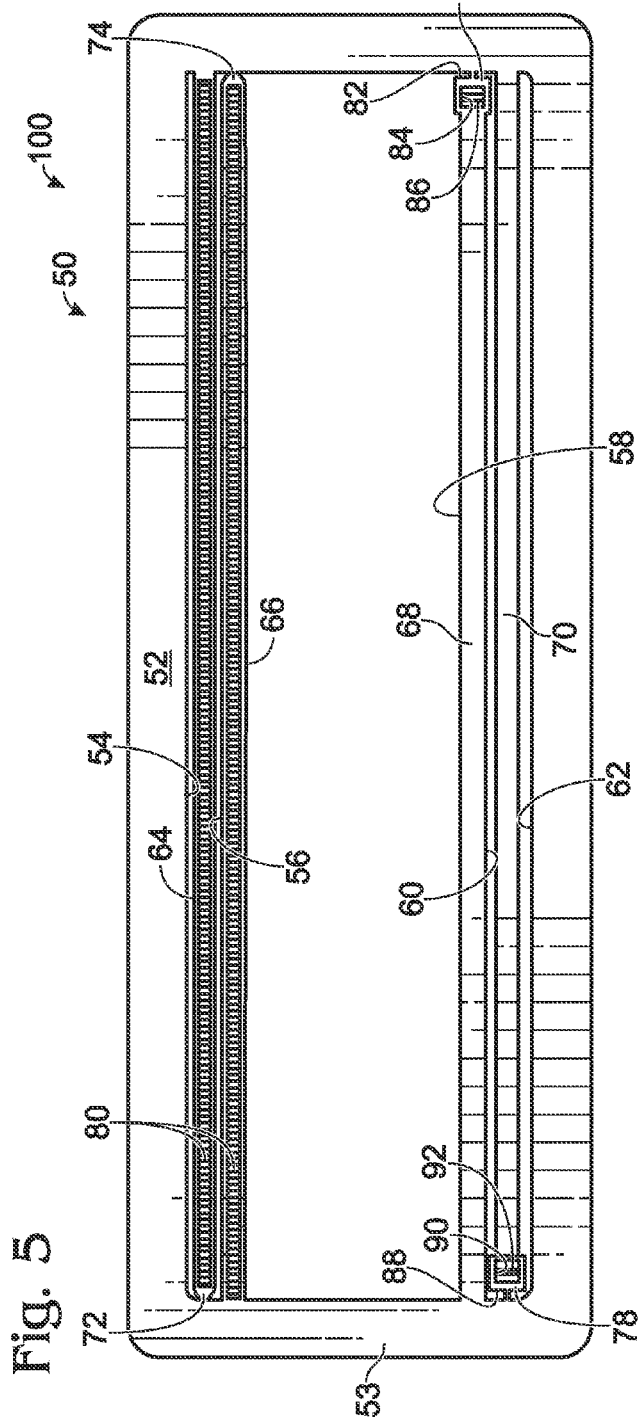
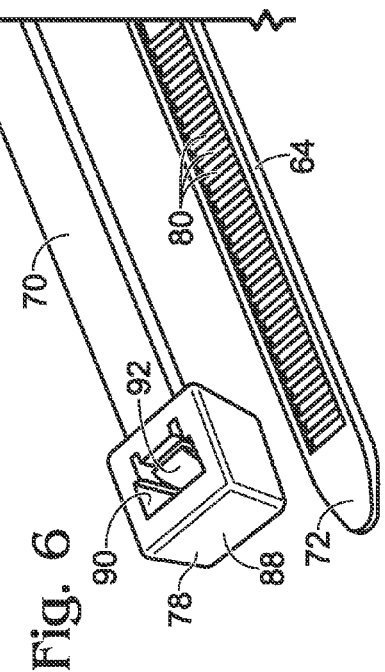

GARMENT HANGER COLLECTION APPARATUS

CROSS-REFERENCE TO RELATED APPLICATIONS

This application claims priority to U.S. Provisional Patent Application Ser. No. 61/684,678, which was filed on Aug. 17, 2012 and entitled "Hanger Collection System." The complete disclosure of the above application is hereby incorporated by reference for all purposes.

BACKGROUND OF THE DISCLOSURE

Hangers may be used to facilitate hanging or supporting of various garments, such as coats, jackets, sweaters, shirts, blouses, dresses, trousers, skirts, kilts, and/or other clothing items. Hangers may sometimes be referred to as "garment hangers," "clothes hangers," or "coat hangers." Hangers may include a hook attached to at least one arm section. The hook may be used to hang or suspend the hangers from a pole, a rod, and/or other structure. The arm section(s) may be in the shape of human shoulders designed to facilitate hanging of the clothing item, and/or may be any suitable shape(s).

In some examples, the hangers may include first and second arm sections attached to the hook and extending outwardly from the hook, and a third arm section (or lower bar) connecting the first and second arm sections. The third arm section may be used for hanging additional clothing items, such as trousers or skirts. The lower bar may include one or more clips for suspending clothing items, such as shorts or skirts. The hangers may be any suitable curvilinear and/or rectilinear shape(s). For example, the hangers may be triangular in shape, such as having first, second, and/or third arm sections. Alternatively, the hangers may include a hook and first and/or second arm sections (such as coaxial first and second arm sections), which may include one or more clips. The hangers may be made of any suitable materials, such as wire, wood, and/or polymer materials.

Although the hangers may store a multitude of clothing items, those hangers must be stored when not in use to facilitate their reuse. For example, in the textile rental industry, hangers may be used to deliver garments to customers. After garments are removed from the hanger by the user, the hanger may be discarded or placed on a hanger collection rack. Those hangers may then be picked up by the garment delivery person on their next visit. However, those hangers may be loosely stacked and tangled such that one or more of the hangers are no longer usable. Personnel may sort, straighten, and/or organize the returned hangers in a garment processing plant. Alternatively, a garment hanger collection apparatus that is configured to organize the hangers and prevent tangling may be used. That apparatus may additionally, or alternatively, bind those hangers.

Examples of garment hanger collection apparatus are described in U.S. Pat. Nos. 7,828,144; 7,377,396; 6,520,349; 6,230,904; 6,109,457; 5,924,578; 5,833,184; 5,188,241; 4,768,658; 4,424,905; 4,016,981; 3,692,188; 3,661,268; 3,490,599; 3,357,544; 3,115,968; 2,918,174; 2,609,919; 2,530,609; 2,122,324; D556,450; D465,352; D417,802; and D335,402. The complete disclosures of the above patents are hereby incorporated by reference for all purposes.

SUMMARY OF THE DISCLOSURE

The present disclosure is directed to a garment hanger holder. The garment hanger holder may include a holder base and a planar holder member fixedly attached to, or formed with, the holder base. The holder member may have an elongate slot sized to receive hooks of one or more garment hangers in a first orientation to hang the one or more garment hangers from the hooks. The garment hanger holder may additionally include a planar orientation member fixedly attached perpendicular to, or formed perpendicular with, the holder member and configured to obstruct and prevent the hooks from being inserted in the elongate slot in an orientation different from the first orientation.

The present disclosure is also directed to a garment hanger binder. The garment hanger binder may have a planar binder base. The planar binder base may include a frame and first and second elongated apertures defining a first elongated strip therebetween having a first end that is configured to be detached to allow the first end to be moved away from the first and second elongated apertures. The planar binder base may additionally include a third elongated aperture. The second and third elongated apertures defining a second elongated strip therebetween having a second end that is configured to be detached to allow the second end to be moved away from the second and third elongated apertures.

The planar binder base may further include a fourth elongated aperture. The third and fourth elongated apertures defining a third elongated strip therebetween having a third end that is configured to be detached to allow the third end to be moved away from the third and fourth elongated apertures. The planar binder base may additionally include a fifth elongated aperture. The fourth and fifth elongated apertures defining a fourth elongated strip therebetween having a fourth end that is configured to be detached to allow the fourth end to be moved away from the fourth and fifth elongated apertures. The first and second elongated strips may include a plurality of ridges. The ends of the third and fourth elongated strips may include a connector assembly having an opening and teeth configured to engage one or more ridges of the plurality of ridges when one of the first and second elongated strips is inserted through the opening.

The present disclosure is further directed to a garment hanger collection apparatus. The garment hanger collection apparatus may have a garment hanger holder. The garment hanger holder may include a holder base and a planar holder member fixedly attached to, or formed with, the holder base. The holder member may have an elongate slot sized to receive hooks of one or more garment hangers in a first orientation to hang the one or more garment hangers from the hooks. The garment hanger holder additionally may include a planar orientation member fixedly attached perpendicular to, or formed perpendicular with, the holder member and configured to obstruct and prevent the hooks from being inserted in the elongate slot with an orientation different from the first orientation.

The garment hanger collection apparatus may additionally include a garment hanger binder. The garment hanger binder may have a planar binder base. The planar binder base may include a frame and first and second elongated apertures defining a first elongated strip therebetween having a first end that is configured to be detached to allow the first end to be moved away from the first and second elongated apertures. The planar binder base may additionally include a third elongated aperture. The second and third elongated apertures defining a second elongated strip therebetween having a second end that is configured to be detached to allow the second end to be moved away from the second and third elongated apertures. The planar binder base may further include a fourth elongated aperture. The third and fourth elongated apertures defining a third elongated strip therebetween having a third end that is configured to be detached to allow the third end to be moved away from the third and fourth elongated apertures.

The planar binder base may additionally include a fifth elongated aperture. The fourth and fifth elongated apertures defining a fourth elongated strip therebetween having a fourth end that is configured to be detached to allow the fourth end to be moved away from the fourth and fifth elongated apertures. The first and second elongated strips may include a plurality of ridges. The ends of the third and fourth elongated strips may include a connector assembly having an opening and teeth configured to engage one or more ridges of the plurality of ridges when one of the first and second elongated strips is inserted through the opening. The first and fourth elongated strips may be configured to wrap around a first portion of the hooks of the one or more garment hangers and to attach to each other. The second and third elongated strips may be configured to wrap around a second portion of the hooks different from the first portion and to attach to each other.

BRIEF DESCRIPTION OF THE DRAWINGS

FIG. 3 is a front view of the garment hanger holder of FIG. 1.

FIG. 4 is an isometric view of another example of a garment hanger holder of a garment hanger collection apparatus.

FIG. 5 is a top view of an example of a garment hanger binder of a garment hanger collection apparatus.

FIG. 6 are partial views of the garment hanger binder of FIG. 5 showing end portions of two elongated strips of the garment hanger binder.

DETAILED DESCRIPTION OF THE DISCLOSURE

Figure 1:
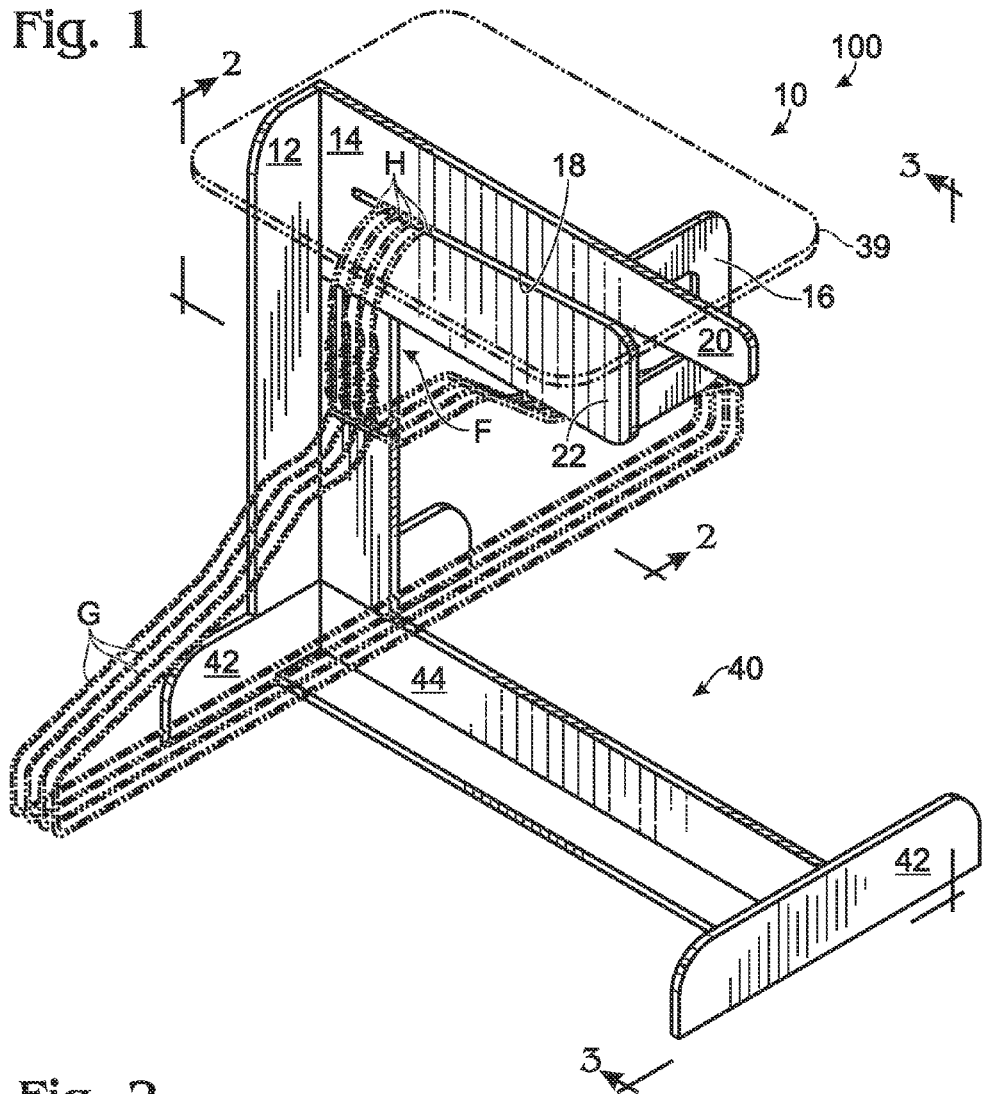
FIG. 1 is an isometric view of an example of a garment hanger holder of a garment hanger collection apparatus.

A garment hanger collection apparatus 100 may be used to organize and/or bind a plurality of garment hangers G. The garment hanger collection apparatus may include a garment hanger holder 10 configured to store a plurality of garment hangers. FIG. 1 shows an example of garment hanger holder 10. The garment hanger holder may include a holder base 12, a holder member 14, and an orientation member 16. The holder base, the holder member, and the orientation member may be made of any suitable materials, such as one or more metal and/or polymer materials. The holder base may include any suitable structure configured to support other components of the garment hanger holder.

Figure 2:
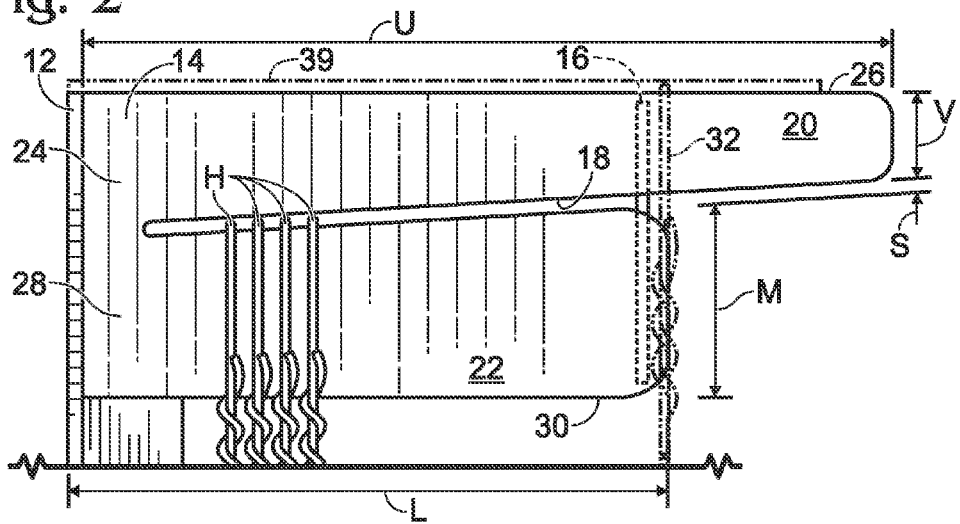
FIG. 2 is a partial side view of the garment hanger holder of FIG. 1.

The holder member may be attached to the base, such as fixedly attached to the base, or formed with the holder base. Additionally, the holder member may include any suitable structure configured to support garment hangers. For example, the holder member may include an elongate slot 18 sized to receive hooks of the garment hangers in a first orientation F (such as shown in FIG. 1) to hang the garment hangers from the hooks. The elongate slot may include a width S sized to prevent stacking of hooks within the elongate slot, as shown in FIG. 2. In other words, the elongate slot may include width S sized to receive only a single hook (and not multiple hooks) for each plane perpendicular to the elongate slot.

In some examples, the holder member may be planar or contained within a single plane (may sometimes be referred to as "a planar holder member"). The elongate slot may divide holder member 14 between an upper portion 20 and a lower portion 22. In other words, the holder member may include upper portion 20 and lower portion 22 with the elongate slot disposed or formed between the upper and lower portions.

The upper portion may have a length U in a direction parallel to the elongate slot, while the lower portion may have a length L in a direction parallel to the elongate slot, as shown in FIG. 2. The upper and lower portions may have lengths that are different or the same. For example, upper portion 20 may have length U that is greater than length L of lower portion 22. Alternatively, the upper portion may have length U that is less than length L of lower portion 22.

The upper portion may include a first end portion 24 and a second end portion 26, as shown in FIG. 2. First end portion may be attached to (such as fixedly attached to) or formed with base 12. Similarly, the lower portion may include a first end portion 28 and a second end portion 30. First end portion 28 may be attached to (such as fixedly attached to) or formed with base 12. Elongate slot 18 may be along any suitable portions of the upper and lower portions. For example, the elongate slot may begin at second end portion 30 and may end just prior (or adjacent to) first end portions 24 and 28. Alternatively, the elongate slot may be from second end portion 30 to first end portions 24 and 28.

In some examples, the upper and/or lower portions may be sized to prevent hanging the hooks of the garment hangers from the upper portion instead of from the elongate slot. For example, the upper portion may include a width V along a direction perpendicular to the elongate slot and the lower portion may include a width M along a direction perpendicular to the elongate slot, as shown in FIG. 2. Widths V, M, and/or S may be sized such that the hooks of the garment hangers cannot be hung from the upper portion past or beyond second end portion 30. In other words, the sum of the widths of the upper portion, the elongate slot, and/or the lower portion may be greater than a clearance distance C of the garment hanger between the portion of the hook where the hook is hung and an arm section (shown in FIG. 3).

In some examples, the width of only the upper portion may be greater than the clearance distance of the garment hangers. When the lower portion has a length greater than or about equal to the length of the upper portion, the width of the upper and/or lower portions may completely prevent the hanging of the hooks of the garment hangers from the upper portion instead of allowing the hanging of hanger on the upper portion until a particular point on the upper portion because of the width of the lower portion.

Orientation member 16 may be attached to (such as fixedly attached to) the holder member and/or formed with the holder member. The orientation member may be attached perpendicular and/or parallel to the holder member. In some examples, orientation member 16 may be planar or contained within a single plane (may sometimes be referred to as "a planar orientation member").

The orientation member may include any suitable structure configured to obstruct and/or prevent the hooks of the garment hangers from being inserted in elongate slot 18 in an orientation different from the first orientation. For example, orientation member 16 may obstruct the hooks of the garment hangers from being inserted as shown at 34 in FIG. 3. Additionally, the orientation member may prevent an arm section (instead of the hook) of the garment hangers from being inserted into the elongate slot. In other words, the orientation member also may prevent the garment hangers from being hung upside down with the hooks at the bottom. Moreover, orientation member 16 may prevent or obstruct hanging of the hooks of the garment hangers on the upper portion past the orientation member, as shown in dashed lines at 32 in FIG. 2.

Orientation member 16 may, for example, include a first end portion 36 and a second end portion 38, as shown in FIG. 3. First end portion 36 may be attached to (such as fixedly attached to) any suitable part(s) of lower portion 22, and second end portion 38 may be attached to (such as fixedly attached to) any suitable part(s) of upper portion 20. For example, first end portion 36 may be attached to the second end portion of the lower portion, while second end portion 38 may be attached to a part disposed between the first and second end portions of the upper portion. The orientation member may be any suitable shape(s), such as U-shaped, V-shaped, etc.

In some examples, garment hanger holder 10 may include a hood 39, as shown in FIG. 1. The hood may include any suitable structure configured to prevent hanging of the hooks of the garment hangers from at least a substantial part of the upper portion instead of, or in addition to, hanging from the elongate slot. For example, hood 39 may have a width greater (or substantially greater) than the hook's width such that a user cannot hang the garment hangers from the hood. Hood 39 may be attached to, or formed with, the upper portion and/or the base. In some examples, hood 39 may cover at least a substantial part of the upper portion. In other words, the upper portion may be disposed between the lower portion and the hood. In some examples, the hood may cover and/or obstruct the entire length of the upper portion such that the hooks (and/or any other parts) of the garment hangers cannot be hung from the upper portion. The hood may be planar or contained within a single plane (may also be referred to as a "planar hood"). Although the hood is shown to be perpendicular to the holder member, the hood may be attached to, or formed with, the holder member at any suitable angle(s).

In some examples, garment hanger holder 10 may include a support assembly 40, as shown in FIG. 1. The support assembly may include any suitable structure configured to be supported on a support surface. The support assembly may, for example, include one or more legs 42 and a cross member 44 configured to be supported on a support surface. Holder base 12 may be attached to (such as fixedly attached to), or formed with the support assembly. Although garment hanger holder 10 is shown to include two legs and a cross member, the garment hanger holder may include one, three, four, or more legs and/or may exclude a cross member.

In some examples, holder base 12 may include holes 46 configured to receive fasteners 48 to fasten, attach, or fixedly attach the holder base to a support surface R of a structure T, such as to a horizontal, vertical, or other surface R of that structure. When the holder base is attached to a vertical surface, the holder member may extend perpendicularly away from that surface, as shown in FIG. 4. Alternatively, when the holder base is attached to a horizontal surface, the holder member may be parallel to that surface. Although holder base 12 is shown to include two holes 46, the holder base may include any suitable number of holes. Additionally, although particular fasteners 48 are shown, any suitable fasteners may be used to attach the holder base to the structure.

Garment hanger collection apparatus 100 may additionally, or alternatively, include a garment hanger binder 50, as shown in FIG. 5. The garment hanger binder may include any suitable structure configured to bind garment hangers together, such as when the garment hangers are stored by garment hanger holder 10. For example, the garment hanger binder may include a binder base 52. The binder base may be made of any suitable materials, such as polymer and/or metal materials. In some examples, the binder base may be planar or contained within a single plane (may sometimes be referred to as "a planar binder base").

The binder base may include a frame 53 and a plurality of elongated apertures, such as a first elongated aperture 54, a second elongated aperture 56, a third elongated aperture 58, a fourth elongated aperture 60, and a fifth elongated aperture 62, as shown in FIG. 5. The first and second elongated apertures may define a first elongated strip 64 between those apertures. Additionally, the second and third elongated apertures may define a second elongated strip 66 between those apertures. Moreover, the third and fourth elongated apertures may define a third elongated strip 68 between those apertures. Furthermore, the fourth and fifth elongated apertures may define a fourth elongated strip 70 between those apertures. One or more of the elongated strips may be the same length. In some examples, the first, second, third, and fourth elongated apertures may have the same length.

Although binder base 52 is shown to include five elongated apertures, the binder base may include any suitable number of elongated apertures, such as two, three, four, six, seven, eight, etc., which may define any suitable number of elongated strips, such as two, three, five, six, seven, eight, etc. For example, binder base 52 may include six elongated apertures defining four elongated strips, such as between first and second elongated apertures, second and third elongated apertures, fourth and fifth elongated apertures, and fifth and sixth elongated apertures. Additionally, although the elongated apertures are shown to be parallel to each other, one or more of the elongated apertures may be non-parallel to one or more of the other elongated apertures. In some examples, two or more elongated apertures may be parallel and one or more other elongated apertures may be non-parallel.

As shown in FIGS. 5-6, first elongated strip 64 may include a first end 72 that is configured to be detached to allow the first end to be moved away from the first and second elongated apertures. Additionally, second elongated strip 66 may include a second end 74 that is configured to be detached to allow the second end to be moved away from the second and third elongated apertures. Moreover, third elongated strip 68 may include a third end 76 that is configured to be detached to allow the third end to be moved away from the third and fourth elongated apertures. Furthermore, fourth elongated strip 70 may include a fourth end 78 that is configured to be detached to allow the first end to be moved away from the fourth and fifth elongated apertures.

The first and second elongated strips may include a plurality of ridges 80, which may run across the entire lengths of the strips or just portions of those lengths (such as only in the end portions of the strips). The third end of the third elongated strip may include a first connector assembly 82, which may include any suitable structure configured to engage the ridges of the first or second elongated strip. For example, the first connector assembly may include a first opening 84 and first teeth 86 configured to engage one or more ridges 80 when the first or second elongated strip is inserted through first opening 84, as shown in FIG. 5.

Additionally, the fourth end of the fourth elongated strip may include a second connector assembly 88, which may include any suitable structure configured to engage the ridges of the first or second elongated strip. For example, the second connector assembly may include a second opening 90 and second teeth 92 configured to engage one or more ridges 80 when the first or second elongated strip is inserted through second opening 90, as shown in FIGS. 5-6. Although the first and second elongated strips are shown to include ridges 80 and the first and second connector assemblies are shown to include teeth 86 and 92, the first and/or second elongated strips may include the teeth and the first and/or second connector assemblies may include the ridges. Additionally, although the third and fourth elongated strips are shown to include the connector assemblies, the first and/or second elongated strips may include the connector assemblies and the third and/or fourth elongated strips may include the ridges and/or teeth.

Figure 7:
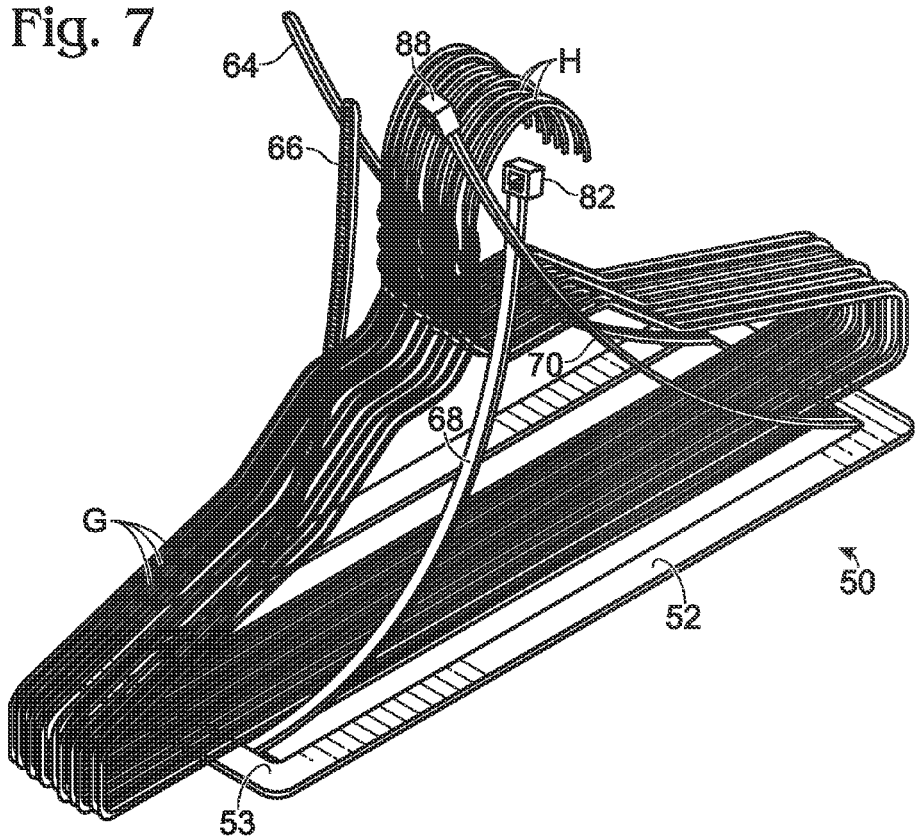
FIG. 7 is an isometric view of the garment hanger binder of FIG. 5 shown supporting garment hangers and showing strips of the garment hanger binder detached from its frame.
Figure 8:
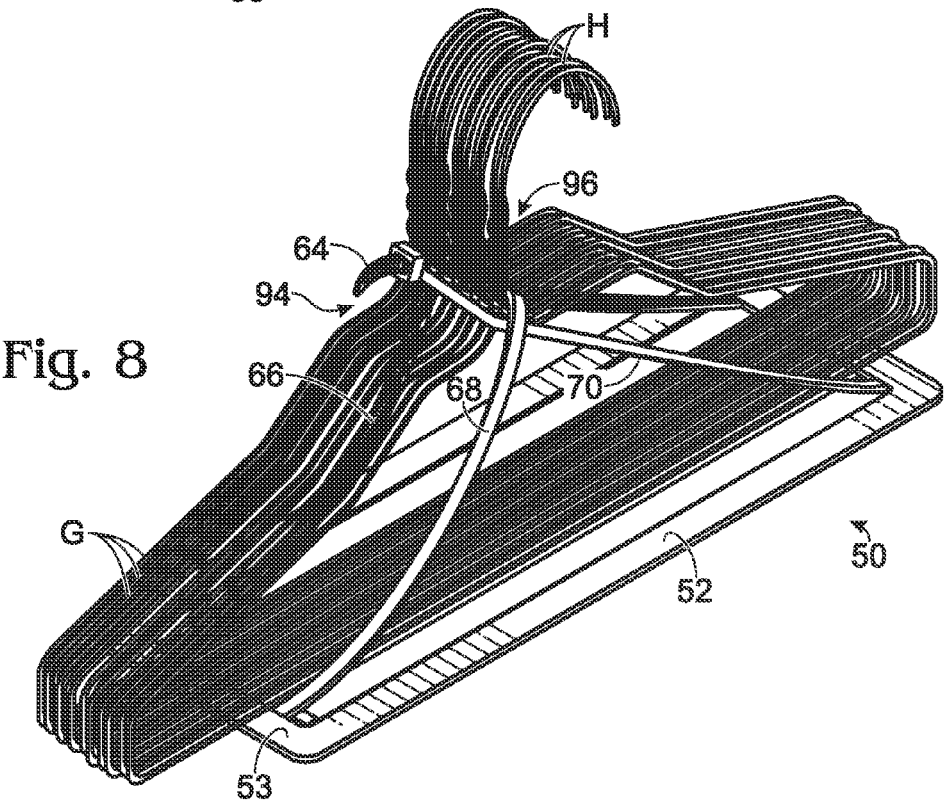
FIG. 8 is an isometric view of the garment hanger binder of FIG. 5 shown supporting garment hangers and showing strips of the garment hanger binder detached from its frame and attached to each other to bind the garment hangers together.

Binder base 52 or frame 53 may be configured to support the garment hangers. For example, the binder base or frame may be configured to support the garment hangers between the second and third elongated strips, as shown in FIG. 6. The third elongated aperture may include a width sized such that a predetermined number of garment hangers is accommodated between the second and third elongated strips. When the garment hangers are supported by the frame, the first and fourth elongated strips may be configured to wrap around a first portion 94 of the hook(s) of the garment hangers and to attach to each other, as shown in FIGS. 7-8. Similarly, the second and third elongated strips may be configured to wrap around a second portion 96 of the hook(s) of the garment hangers and to attach to each other.

In use, the end portions of the first, second, third, and fourth elongated strips may be detached from the frame. Garment hangers may be placed between the second and third elongated strips to rest on the frame. In some examples, the garment hangers may have been organized via garment hanger holder 10. In those examples, garment hanger binder 50 may be brought up against the garment hangers while still hanging from the garment hanger holder such that the garment hangers rest between the second and third elongated strips, or may be removed from the garment hanger holder and placed between the second and third elongated strips to rest on the frame.

The first and fourth elongated strips may be wrapped around a portion of the hooks of the garment hangers. The end of the first elongated strip may be inserted through the connector assembly of the fourth elongated strip until the garment hangers are secured together. The second and third elongated strips may be wrapped around another portion of the hooks of the garment hangers. The end of the second elongated strip may be inserted through the connector assembly of the third elongated strip until the garment hangers are secured together. Other examples of the above method may add, omit, and/or replace one or more steps.

In some examples, garment hanger collection apparatus 100 may include garment hanger holder 10 and exclude garment hanger binder 50. In other examples, the garment hanger collection apparatus may include garment hanger binder 50 and exclude garment hanger holder 10. In further examples, garment hanger collection apparatus 100 may include both the garment hanger holder and the garment hanger binder.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. A garment hanger binder, comprising:
   a planar binder base having:
      a frame,
      first and second elongated apertures defining a first elongated strip therebetween having a first end that is configured to be detached to allow the first end to be moved away from the first and second elongated apertures,
      a third elongated aperture, the second and third elongated apertures defining a second elongated strip therebetween having a second end that is configured to be detached to allow the second end to be moved away from the second and third elongated apertures,
      a fourth elongated aperture, the third and fourth elongated apertures defining a third elongated strip therebetween having a third end that is configured to be detached to allow the third end to be moved away from the third and fourth elongated apertures,
      a fifth elongated aperture, the fourth and fifth elongated apertures defining a fourth elongated strip therebetween having a fourth end that is configured to be detached to allow the fourth end to be moved away from the fourth and fifth elongated apertures;
   wherein the first and second elongated strips include a plurality of ridges, wherein the ends of the third and fourth elongated strips include a connector assembly having an opening and teeth configured to engage one or more ridges of the plurality of ridges when one of the first and second elongated strips is inserted through the opening.

2. The garment hanger binder of claim 1, wherein the frame is configured to support a plurality of garment hangers.

3. The garment hanger binder of claim 2, wherein the frame is configured to support a plurality of garment hangers between the second and third elongated strips.

4. The garment hanger binder of claim 1, wherein the first and fourth elongated strips are configured to wrap around a first portion of hooks of one or more garment hangers and to attach to each other.

5. The garment hanger binder of claim 4, wherein the second and third elongated strips are configured to wrap around a second portion of the hooks different from the first portion and to attach to each other.

6. The garment hanger binder of claim 1, wherein the first, second, third, and fourth elongated apertures have the same length.

7. The garment hanger binder of claim 1, wherein the first, second, third, and fourth elongated apertures are parallel to each other.

8. The garment hanger binder of claim 1, wherein the planar binder base is made of one or more polymer materials.

* * * * *